United States Patent [19]

Himics

[11] 3,759,942

[45] Sept. 18, 1973

[54] CROSSLINKING MONOMERS CONTAINING THE 1-AZA-3,7-DIOXABICYCLO [3.3.0] OCTANE STRUCTURE

[75] Inventor: Richard J. Himics, Lake Hiawatha, N.J.

[73] Assignee: Sun Chemical Corporation, New York, N.Y.

[22] Filed: June 8, 1970

[21] Appl. No.: 44,534

[52] U.S. Cl. .............. 260/307 F, 106/20, 117/93.3, 117/93.31, 161/192, 161/249

[51] Int. Cl. .............................................. C07d 85/26

[58] Field of Search .................................. 260/307 F

[56] References Cited

UNITED STATES PATENTS

| | | | |
|---|---|---|---|
| 3,256,137 | 6/1966 | Danielson | 161/241 |

*Primary Examiner*—Alex Mazel
*Assistant Examiner*—R. V. Rush
*Attorney*—Cynthia Berlow

[57] ABSTRACT

Compounds having the structure

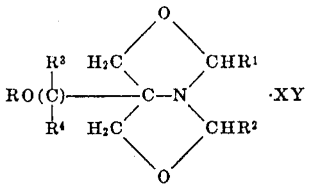

wherein R is $-C(O)CH{=}CH_2$, $-C(O)C(CH_3){=}CH_2$, or $-C(O)CH_2C(COOH){=}CH_2$ $R^1$ and $R^2$ is each hydrogen, phenly, halophenyl, or alkyl of one to 20 carbon atoms and may be the same or different; $R^3$ and $R^4$ is each hydrogen; XY may be absent; X may be hydrogen and Y may be a p-toluenesulfonate radical or a picrate radical; or X may be alkyl of one to 20 carbon atoms and Y may be a halogen, such as 1-aza-5-acryloxymethyl-3,7-dioxabicyclo [3.3.0] octane, are radiation curable and are suitable for use in printing inks, coating compositions, adhesives, and the like.

10 Claims, No Drawings

CROSSLINKING MONOMERS CONTAINING THE 1-AZA-3,7-DIOXABICYCLO [3.3.0] OCTANE STRUCTURE

This invention relates to new and novel organic compounds and, more particularly, to radiation-curable derivatives of 1-aza-5-hydroxymethyl-3,7-dioxabicyclo [3.3.0]octane and to the methods for the preparation of these new compositions.

In accordance with this invention new compounds having the structure

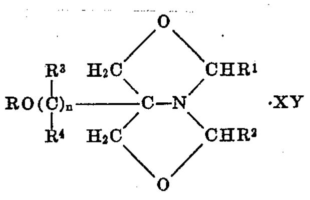

wherein R is -C(O)CH=CH$_2$,

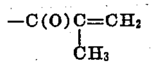

-C(O)CH$_2$(COOH)C=CH$_2$,

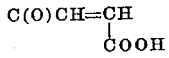

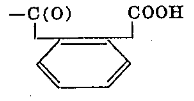

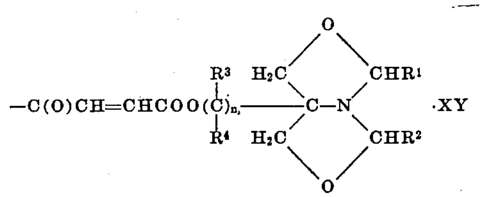

or the like; R$^1$, R$^2$, R$^3$, and R$^4$ is each -H, -C$_6$H$_5$, an alkyl group having from one to 20 carbon atoms, an aryl or an alkyl group having halogen, nitrogen, mercaptan, disulfide, alkene, peroxy, carbonyl, amide, amine, carboxyl, hydroxyl, or the like, substitution and may be the same or different; n is an integer from zero to 20; XY may be absent or X may be -H, an alkyl group having one to 20 carbon atoms, phenyl, benzyl, substituted phenyl, substituted benzyl, or other condensed aromatic radical, or the like, and Y may be -Cl, -Br, -I, -SO$_3$C$_6$H$_4$CH$_3$, OC$_6$H$_2$(NO$_2$)$_3$, -HSO$_4$, -H$_2$PO$_4$, -NO$_3$, or the like, or Y may be absent and X may be BF$_3$, FeCl$_3$, AlCl$_3$, or the like, have been prepared which are radiation-susceptible, making them suitable for a variety of end uses, such as for example inks, coating compositions, adhesives, textile and paper finishing agents, and the like.

These monomeric esters are produced, for example, by reacting 1-aza-5-hydroxymethyl-3,7-dioxabicyclo[3.3.0]octane (II) with an appropriate reactant, e.g., an acid chloride, acid anhydride, or alkyl ester, in an inert solvent at a temperature of about −5° to 150° C. The general reaction for preparing these esters and salts may be illustrated by the following equations in which R, R$^1$, R$^2$, R$^3$, R$^4$, X, Y, and n are as defined above and Z is halogen, alkoxy, or a carboxy substituted alkyl group having about one to 20 carbon atoms:

(1)

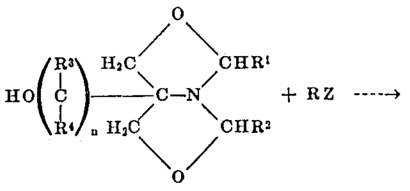

II

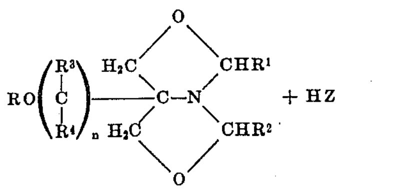

I (2)

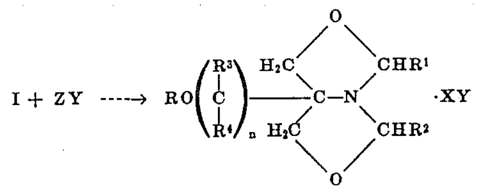

Examples of the products of this invention include, but are not limited to, 1-aza-5-acryloxymethyl-3,7-dioxabicyclo[3.3.0]octane, 1-aza-5-methacryloxymethyl-3,7-dioxabicyclo[3.3.0]octane, and the following substituted 1-aza-3,7-dioxabicyclo[3.3.0]octanes:

1-aza-2-propyl-5-acryloxymethyl-3,7-dioxabicyclo [3.3.0] octane, 1-aza-2-propyl-5-methacryloxymethyl-3,7-dioxabicyclo [3.3.0] octane, 1-aza-2,8-dipropyl-5-acryloxymethyl-3,7-dioxabicyclo[3.3.0] octane, 1-aza-2,8-dipropyl-5-methacryloxymethyl-3,7-dioxabicyclo[3.3.0] octane, 1-aza-2-phenyl-5-acryloxymethyl-3,7-dioxabicyclo [3.3.0] octane, 1-aza-2,8-diphenyl-5-acryloxymethyl-3,7-dioxabicyclo [3.3.0] octane, 1-aza-2,8-diphenyl-5-methacryloxymethyl-3,7-dioxabicyclo[3.3.0]octane, 1-aza-2-(4′-chlorophenyl)-5-acryloxymethyl-3,7-dioxabicyclo [3.3.0]octane, 1-aza-2,8-di (4′-chlorophenyl)-5-acryloxymethyl-3,7-dioxabicyclo [3.3.0] octane, 1-aza-2-(4′-chlorophenyl)-5-methacryloxymethyl-3,7-dioxabicyclo [3.3.0] octane, 1-aza-2,8-di (4′-chlorophenyl)-5-methacryloxymethyl-3,7-dioxabicyclo [3.3.0] octane, 1-aza-2-(3′, 4′-dichlorophenyl)-5-acryloxymethyl-3,7-dioxabicyclo [3.3.0] octane, 1-aza-2-(3′, 4′-dichlorophenyl)-5-methacryloxymethylmethyl-3,7-dioxabicyclo [3.3.0] octane, 1-aza-2-(2′, 4′-dichlorophenyl)-5-acryloxymethyl-3,7-dioxabicyclo [3.3.0] octane, 1-aza-2-(2′, 4′-dichlorophenyl)-5-methacryloxymethyl-3,7-dioxabicyclo [3.3.0] octane, 1-aza-2-(4′-methoxyphenyl)-5-acryloxymethyl-3,7-dioxabicyclo [3.3.0] octane, 1 -aza-2,8-di(4′-methoxyphenyl)-5-acryloxymethyl -3,7-dioxabicyclo [3.3.0] octane, 1-aza-2-(4′-methoxyphenyl)-5-methacryloxymethyl-3,7-dioxabicyclo [3.3.0] octane, 1-aza-2,8-di (4′-methoxyphenyl)-5-methacryloxymethyl -3,7-dioxabicyclo [3.3.0] octane, 1-aza-2-(4′-nitrophenyl)-5-acryloxymethyl-3,7-dioxabicyclo [3.3.0] octane, 1-aza-2,8-di (4′-nitrophenyl)-5-acyloxymethyl-3,7-dioxabicyclo [3.3.0] octane, 1-aza-2-(4′-nitrophenyl)-5-methacryloxymethyl-3,7-dioxabicyclo [3.3.0] octane, 1-aza-2,8-di (4′-nitrophenyl)-5- methacryloxymethyl-3,7-dioxabicyclo [3.3.0] octane, 2,2'-bi(1-aza-5-acryloxymethyl-3,7-dioxabicyclo [3.3.0] octane), 2,2-'bi(1-aza-5-methacryloxymethyl-3,7-dioxabicyclo [3.3.0] octane), and the like, and their salts, and mixtures thereof.

The reaction with acid chloride is carried out at temperatures ranging from about −5° to 150° C., with temperatures of about 0° to 10° C. being preferred. The reaction pressure may range from about 5 to 50 p.s.i., preferably about 10 to 20. In general the reaction takes place in an inert organic solvent, e.g., benzene, toluene, xylene, chloroform, methylene chloride, ethylene dichloride, carbon tetrachloride, or the like.

Although generally equimolar amounts of 1-aza-5-hydroxymethyl-3,7-dioxabicyclo[3.3.0]octane (II) and the acid chloride are employed in the reaction, the ratio of II to the acid chloride may range from about 3 to 1:1 to 2.

Optionally an HCl scavenger may be used, such as for example triethylamine, tripropylamine, tributylamine, butyldimethyl-amine, triamylamine, amyldiethylamine, amyldimethylamine, or the like, in an amount ranging from about 25 to 300, and preferably about 75 to 150, per cent, based on the weight of the reactants.

If desired, the reaction may be carried out by the ester interchange method of interacting a lower alkyl ester of methacrylic acid, acrylic acid, or itaconic acid with the alcohol in the presence of a suitable catalyst, such as for example dibutyltin oxide, dimethyltin oxide, diphenyltin oxide, aluminum isopropoxide, titanium tetraisopropoxide, titanium tetrabutoxide, tetraisopropyl titanate, tetrabutyl titanate, and the like, and their mixtures, in amounts ranging from about 0.05 to 4, and preferably about 0.2 to 0.8, per cent, based on the weight of the reactants.

Useful inhibitors include hydroquinone, catechol, 1,4-naphthoquinone, o-xyloquinone, p-toluoquinone, tetrachloro-p-benzoquinone, trichloroquinone, phenanthrene quinone, pyrogallol, phenothiazine, or a dry oxygen sparge in combination with any of the above.

The starting alcohols, for the process embodied herein may be prepared by known procedures which form no part of the instant invention. Thus, for example, 1-aza-5-hydroxymethyl-3,7-dioxabicyclo[3.3.-0]octane (II) can be readily prepared by the methylolation of tris(hydroxy-methyl)aminomethane (THAM) according to the following equation:

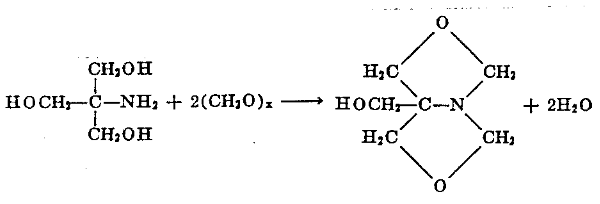

II

Substituted 1-aza-3,7-dioxabicyclo [3.3.0] octanes may be prepared in a similar way by using THAM with the appropriate aldehyde or ketone. Instead of THAM, suitable beta-alkylol amines may be used.

The esters thus-formed may be converted into novel salts by reaction with, for example, p-toluene sulfonic acid, picric acid, methyl chloride, methyl bromide, methyl iodide, hydrochloric acid, nitric acid, phosphoric acid, and so forth, for use in, e.g., polymerizable dyes by dye/monomer salt formation, polymerizable emulsifying agents, water-solublizing comonomers, surface-active agents, radiation-crosslinkable films, polymerizable chemical catalysts, and as radiation-sensitive water-soluble crosslinking agents.

In addition, the esters may be copolymerized with each other or with any other suitable comonomer, such as for example styrene, ethyl acrylate, butyl acrylate, methyl methacrylate, acrylic acid, methacrylic acid, acrylonitrile, acrylamide, n-methylolacrylamide, and the like, the resulting copolymers likewise being radiation-curable.

It is also within the scope of this invention to use the novel esters in combination with other radiation-curable monomeric materials, such as those disclosed in copending U.S. Pat. applications Ser. No. 685,249 (now U.S. Pat. No. 3,551,246) and Ser. No. 850,633 (now abandoned), e.g., the ethylenically unsaturated esters of di-, tri-, and tetrahydric alcohols and their derivatives.

Although the monomers may be polymerized thermally or in the presence of free-radical producing agents, polymerization preferably takes place when the monomer is exposed to a source of radiation, e.g., ultraviolet light or electron beam radiation, under normal aerobic conditions.

By the process of this invention there have been produced new monofunctional monomers which have novel crosslinking groups; that is, in addition to the polymerizable ester groups (acrylate, methacrylate, or itaconate) the monomers possess an internal "active" group, thus enhancing the activity of the compounds to irradiative and chemical curing.

The monomers exhibit extremely fast photocure rates which are attributed to participation of the organic residue in a radiation-catalyzed photooxidation. Accordingly, the monomeric esters possess the stability associated with monofunctional esters, but under certain conditions they can be utilized as di- or trifunctional materials.

It is believed that the active principle whereby the esters enter the accelerated crosslinking/grafting reactions is essentially a photooxidation of the bicyclic moiety followed by rapid decomposition of the initial hydroperoxide leading to the generation of radicals that can participate in a crosslinking sequence, as follows:

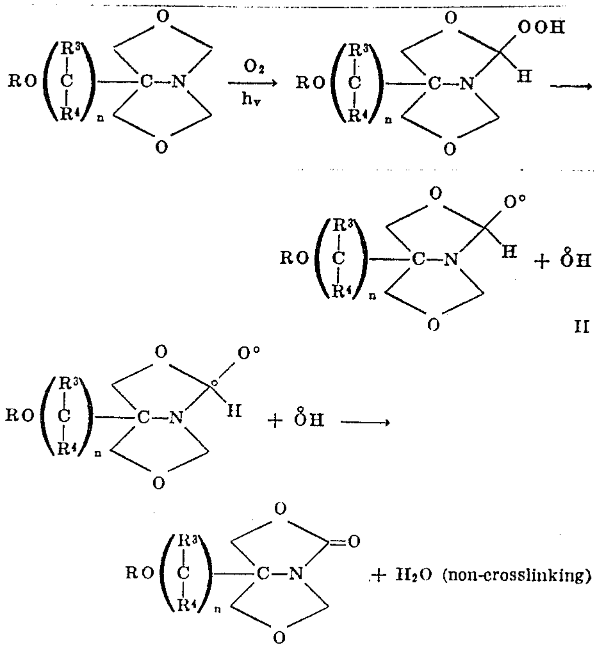

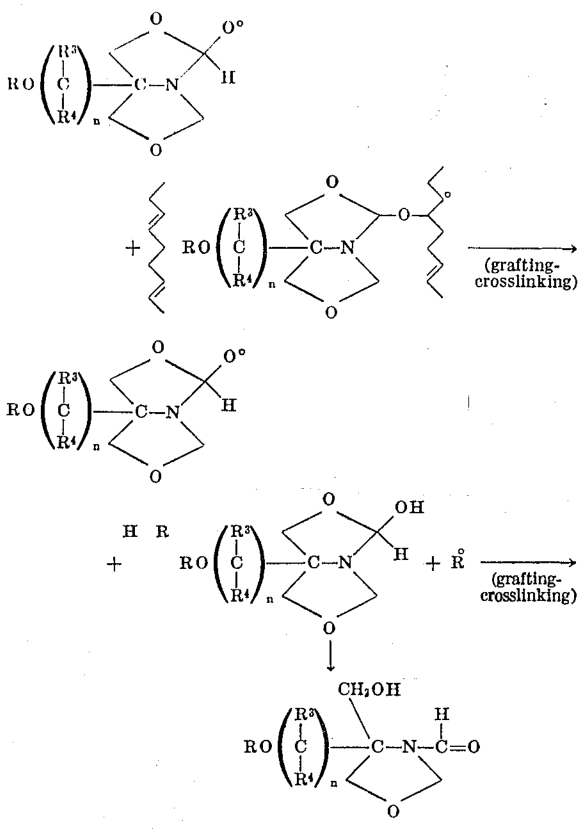

The reactive intermediate II can account for the rapid cure and crosslinking mechanism. In addition, the hydroxide radical can initiate polymerization, abstract hydrogen atoms to generate free radicals at crosslinking sites, and add to residual double bonds to produce a secondary or tertiary alcohol as well as another free radical on a carbon chain.

The good cure rates of these monomeric compounds may be further improved, if desired, by the addition of a photoinitiator. Any suitable photoinitiator or sensitizer may be used, such as for example an acyloin or a derivative thereof, such as benzoin methyl ether, benzoin ethyl ether, desyl bromide, desyl bromide, desyl chloride, desyl amine, and the like, and mixtures thereof. It may also be a halogenated aliphatic, aromatic, or alicyclic hydrocarbon, or a mixture thereof, in which the halogen atoms are attached directly to the ring structure in the aromatic and alicyclic compounds, that is, the halogen is bonded directly to the aromatic hydrocarbon nucleus, and the halogen atoms are attached to the carbon chain in the aliphatic compounds. The halogen may be chlorine, bromine, iodine, or fluorine. Suitable photoinitiators include, for example, polychlorinated polyphenyl resins, such as polychlorinated diphenyls, polychlorinated triphenyls, and mixtures of the two; chlorinated rubbers; copolymers of vinyl chloride and vinyl isobutyl ether; chlorinated aliphatic waxes; perchloropentacyclodecane, chlorinated paraffins,; mono-and polychlorobenzenes; mono- and polybromobenzenes; mono- and polychloroxylenes; mono- and polybromoxylenes; dichloromaleic anhydride; 1-chloro-2-methyl naphthalene; 2,4-dimethylbenzene sulfonyl chloride; 1-bromo-3-(m-phenoxyphenoxy benzene); 2-bromoethyl methyl ether; chlorendic anhydride; and so forth; and mixtures of these. Other known photoinitiators also may be used.

The ratio of the amount of the monomer to the photoinitiator in the composition may range from about 98.2 to about 20:80, and preferably from about 80:20 to about 20:80.

Conventional colorants, i.e., pigments or dyes, may be used in conventional quantities in the formulations of this invention. Suitable organic and inorganic pigments include carbon black, zinc oxide, titanium dioxide, phthalocyanine blue, phthalocyanine green, benzidine yellow, hansa yellow, naphthol yellow lake, cadmium orange, cadmium yellow, chrome yellow, Prussian blue, bronze blue, chrome green, peacock blue lake, milori blue, ultramarine blue, red lake C, para red, toluidine red, sodium lithol red, barium lithol red, lithol rubine, molybdated scarlet chrome, ferric oxide, aluminum hydrate, and the like. The vehicle may be used, for example, in an amount ranging from about 20 to 99.9 per cent of the weight of the total composition and a colorant from about 0.1 to 80 per cent of the weight of the total composition.

Other commonly known modifiers can be incorporated into the formulations using the compounds of the present invention. These include plasticizers; wetting agents for the colorant, such as dichloromethylstearate and other chlorinated fatty esters; leveling agents, such as lanolin, paraffin waxes, and natural waxes such as cerise wax and carnauba wax; and the like. Such modifiers are generally used in amounts ranging from about 1 to 3 per cent by weight, preferably about 1 per cent, based on the total weight of the formulation.

The formulations may be prepared in any conventional manner, such as, for example, in a three-roll mill, a sand mill, a ball mill, a colloid mill, or the like, in accordance with known dispersion techniques. The resulting composition is applied in any suitable manner onto a substrate.

Variables which determine the rate at which a radiation-curable composition will dry include the specific ingredients in the composition, the concentration of the photoinitiator, the thickness of the material, the nature and intensity of the radiation source and its distance from the material, the presence or absence of oxygen, and the temperature of the surrounding atmosphere. Irradiation may be accomplished by any one or a combination of a variety of methods. The composition may be exposed, for example, to actinic light from any source and of any type as long as it furnishes an effective amount of ultraviolet radiation, since the compositions of this invention activatable by actinic light generally exhibit their maximum sensitivity in the range of about 1,800 A. to 4,000 A., and preferably about 2,000 A. to 3,000 A.; electron beams; gamma radiation emitters; and the like; and combinations of these. Suitable sources include, but are not limited to, carbon arcs, mercury-vapor arcs, fluorescent lamps with special ultraviolet light-emitting phosphors, argon glow lamps, photographic flood lamps, Van der Graaff accelerators, Resonant transformers, Betatrons, linear accelerators, gamma radiation emitters, and so forth, and combinations of these.

The time of irradiation must be sufficient to give the effective dosage. Irradiation may be carried out at any convenient temperature, and most suitably is carried out at room temperature for economic reasons. Distances of the radiation source from the work may range from about 1/8 to 10 inches, and preferably from about 1/8 to 7 inches.

The novel compounds of this invention cure rapidly to films that are flexible; possess good adhesion to many substrates; have good shelf stability; have good resistance to organic solvents and water; and ar rub-resistant. Inks, coatings, adhesives, and the like made from the compounds of this invention are solvent-free and dry almost instantaneously in air at ambient temperature, thus eliminating the need for ovens as well as avoiding the air pollution, fire hazards, odor, and so forth, that accompany the use of volatile solvents. The inks and coatings form extremely hard and durable films on a wide variety of substrates, such as, for example, paper; newsprint; coated paper stock; irregular, e.g., corrugated board; metal, e.g., foils, meshes, cans, and bottle caps; wood; rubbers; polyesters, such as polyethylene terephthalate; glass; polyolefins, such as treated and untreated polyethylene and polypropylene; cellulose acetate; fabrics such as cotton, silk, and rayon; and the like. They exhibit no color change in the applied film when subjected to the required curing conditions and they are resistant to flaking; smudging; salt spray; scuffing; rubbing; and the deteriorating effects of such substances as alcohols, oils, and fats. In addition, the compounds of this invention withstand both heat and cold, making them useful, for example, in printing inks or coatings for containers that must be sterilized, e.g., at about 150° C. under pressure, and/or refrigerated, e.g., at less than −20° C.; and so forth. They can be used in textile and paper treating systems. Because they cure on weathering to crosslinked water-resistant substances, these esters are suitable for use as overcoats for substrates such as wood, metal, concrete, and nondurable plastics.

While there are disclosed below but a limited number of embodiments of the invention herein presented, it is possible to produce still other embodiments without departing from the inventive concept herein disclosed. It is desired, therefore, that only such limitations be imposed on the appended claims as are stated therein. Unless otherwise specified, all parts are given by weight.

EXAMPLE 1

A. 1-aza-5-acryloxymethyl-3,7-dioxabicyclo[3.3.0]octane

To a 1-liter, three necked reaction flask equipped with stirring motor, reflux condenser, additional funnel, calcium chloride drying tube, and nitrogen inlet was added 290 parts (0.20 mole) of 1-aza-5-hydroxymethyl-3,7-dioxabicyclo [3.3.0]octane dissolved in 710 ml. of benzene. To this was added 0.5 part of hydroquinone and 40.5 parts (0.4 mole, 100 per cent excess) of triethylamine, and the resultant solution was cooled with stirring to 0° C. A nitrogen gas sweep was started, and 18.0 parts (0.20 mole) of acryloyl chloride dissolved in 40 ml. of benzene was added dropwise over a five-hour period, the reaction temperature being maintained at 0°–5° C. by means of an ice-water bath. The mixture was stirred overnight at room temperature and then filtered. 23.2 Parts (84.4 per cent) of triethylamine hydrochloride was isolated. The filtrate was washed three times with saturated cold NaCl solution, dried with anhydrous magnesium sulfate, and stripped on a rotary evaporator. A yellow solid was isolated and recrystallized three times from acetone in a dry ice bath to give a white solid melting at 46°–47° C. (55 per cent of theory) and identified as 1-aza-5-acryloxymethyl-3,7-dioxabicyclo [3.3.0]octane (ADOZ).

Its IR spectrum shows the following absorptions (microns): 5.82 (carbonyl), 6.12 (vinyl), 8.10 (ester), and 12.3 (vinyl). The monomer exhibited a UV spectrum typical of acrylates, showing a strong absorption at 210 mu, a weak band at 252 mu, a shoulder at 272 mu, and a broad band centered at 324 mu.

Analysis of $C_9H_{13}NO_4$:

| | C | H | N | O |
|---|---|---|---|---|
| Calculated: | 54.26 | 6.58 | 7.03 | 32.13 |
| Found: | 54.04 | 6.77 | 6.93 | 32.26 |

The crystalline solid monomer was soluble in water (~ 10 percent), methanol, benzene, ethylenedichloride, chloroform, ethyl ether, and acetone, and insoluble in hexane.

B. When exposed to radiation at a distance of 3 inches from a 550-watt ultraviolet lamp for less then 1 second, a thin deposit of crystalline monomer could not be redissolved in the above solvents which are known to effect solution of the uncrosslinked/polymerized monomer. When 50 parts of the monomer ADOZ was dissolved in 50 parts of the corresponding methacrylate (MADOZ, described in Example 2 below) as the reactive diluant and the uninitiated solution photolyzed at 1-⅛ inch from a 2,100-watt Hanovia lamp, the system cured in 15 seconds to a polymer film.

EXAMPLE 2

A. 1-aza-5-methacryloxymethyl-3,7-dioxabicyclo[3.3.0]octane (MADOZ)

To a 1-liter, 3-necked round-bottomed reaction flask equipped with a stirring motor, a thermometer, distilling head, reflux condenser, air inlet, and heating mantle was added 514 parts (4.5 moles) of ethyl methacrylate, 132 parts (0.9 mole) of 1-aza-5-hydroxymethyl-3,7-dioxabicyclo[3.3.0]octane, 3.0 parts of dibutyltin oxide, and 6.0 parts of hydroquinone. The reaction mixture was stirred with air being introduced below the surface and heated to reflux for about one hour. The ethanol-ethyl methacrylate azeotrope (b.p. 83°–100°) was collected, amounting to about 100 ml. In a period of over about 9 hours the pot temperature went from 118° to 130° C. and the vapor temperature rose rapidly near the end to 115° C. The reaction solution was filtered and stripped on the rotary evaporator to give a dark liquid which was distilled to give a main product fraction (b.p. 90/96°/0.2mm.) amounting to 155 parts (81 per cent of theory). Redistillation gave a clear liquid (b.p. 85°/0.2mm., $n_D^{25}$ 1.4795) which was shown to be greater than 96 per cent pure by gas-liquid phase chromatography analysis through a 20 percent Carbowax 20M on 60–80 Chromosorb W column at 200° C. The IR spectrum of the product, 1-aza-5-methacryloxymethyl-3,7-dioxabicyclo[3.3.0] octane (MADOX), showed the following significant absorptions (microns): 5.8(carbonyl), 6.15–6.20 (vinyl), 8.4–8.6 (ester), and 12.2 (vinyl). The monomer's UV spectrum (methanol) showed major absorptions at 212 mu and 245 mu (shoulder).

Analysis of $C_{10}H_{15}NO_4$:

| | C | H | N | O |
|---|---|---|---|---|
| Calculated: | 56.32 | 7.09 | 6.57 | 30.02 |
| Found: | 56.29 | 7.24 | 6.56 | 29.91 |

It was partially soluble in water; insoluble in hexane; and soluble in methanol, benzene, and ethylenedichloride.

B. The monomer was exposed to ultraviolet radiation as in Example 1(B). It cured to a non-sticky flexible film in about 20 seconds.

C. A mixture of 70 parts of the monomer of part (A) and 30 parts of a mixture of bi- and triphenyls containing 65 weight per cent of chlorine was exposed to ultraviolet radiation as in Example 1(B). The mixture cured to a dry flexible film in about 3.5 seconds.

EXAMPLE 3

1-aza-5-acryloxymethyl-3,7-dioxabicyclo[3.3.0]octane Methyl Iodide

To one part of ADOZ dissolved in 2 cc. of methanol was added 1.42 parts (100 per cent excess) of methyl iodide, and the resultant solution was stored at room temperature for 2½ days. Dilution with diethyl ether gave an oil which crystallized on standing in an ice-water bath to give 1.6 parts (94 per cent) of a yellow solid (m.p. 157°–158°). Recrystallization of the salt twice from methanol gave a slightly yellow solid (m.p. 161°–163°).

Calculated for $C_{10}H_{16}NO_4I$: I, 37.20
Found: I, 37.85

EXAMPLE 4

1-aza-5-acryloxymethyl-3,7-dioxabicyclo[3.3.0]octane p-Toluenesulfonic

Acid Salt

To 9.95 parts (0.05 mole) of ADOZ dissolved in 30 ml. of acetone was added slowly with stirring a solution of 10.76 parts (0.0625 mole, 25 per cent excess) of p-toluenesulfonic acid dissolved in 70 ml. of acetone. A white solid precipitated almost immediately, and stirring was continued for 5 minutes. The reaction mixture was cooled in an ice-water bath and filtered at the water pump, the solid being washed with 60 ml. of cold acetone and air dried. Approximately 15.2 parts (82 per cent) of a white solid was obtained (m.p. 168°–170°). Recrystallization from acetone gave pure ADOZ-p-toluenesulfonic acid salt (m.p. 164°–165°).

Analysis of $C_{16}H_{21}NO_7S$

| | C | H | N | O | S |
|---|---|---|---|---|---|
| Calculated: | 51.74 | 5.70 | 3.77 | 30.16 | 8.63 |
| Found: | 51.75 | 5.14 | 4.05 | 30.51 | 8.75 |

EXAMPLE 5

1-aza-5-methacryloxymethyl-3,7-dioxabicyclo[3.3.-0]octane p-Toluenesulfonic Acid Salt The process of Example 4 was repeated except that MADOZ was reacted with p-toluenesulfonic acid in acetone to give the MADOZ-p-toluenesulfonic acid salt (m.p. 175–177°).

EXAMPLE 6

1-aza-5-acryloxymethyl-3,7-dioxabicyclo[3.3.0]octane Picric Acid Salt

To about 2.0 parts (0.01 mole) of ADOZ dissolved in 5 ml. of acetone was added 2.3 parts (0.01 mole) of picric acid dissolved in 5 ml. of acetone. In less than 10 seconds a yellow solid separated (m.p. 147°–151°) which was recrystallized from hot benzene to give an intensely yellow solid (m.p. 149°).

Analysis of $C_{15}H_{16}N_4O_{11}$:

| | C | H | N |
|---|---|---|---|
| Calculated | 42.06 | 3.77 | 13.08 |
| Found: | 42.35 | 3.37 | 13.78 |

EXAMPLE 7

1-Aza-5-Acryloxymethyl-2,8-di-n-propyl-3,7-dioxabicyclo[3.3.0] Octane (ADOP)

To 150 parts (1.5 mole) of ethyl acrylate was added 1.0 part of dibutyltin oxide, 2.0 parts of p-methoxyphenol, and 68.7 parts (0.3 mole) of 1-aza-5-hydroxymethyl-2,8-di-n-propyl-3,7-dioxabicyclo [3.3.0] octane. The reaction mixture was heated to reflux and an ethanol/ethyl acrylate azeotrope boiling at about 89°–91° was collected over a period of five hours, amounting to about 80 ml. The crude reaction solution was filtered, stripped on the rotary evaporator, and distilled to give about 67 parts (79 per cent) of a liquid that boiled mainly at 108°–109°/0.1mm.

Analysis of $C_{15}H_{25}NO_4$:

| | C | H | N | O |
|---|---|---|---|---|
| Calculated: | 63.58 | 8.89 | 4.94 | 22.59 |
| Found: | 63.84 | 8.88 | 4.99 | 22.29 |

EXAMPLE 8

1-Aza-2-propyl-5-acryloxymethyl-3,7-dioxabicyclo[3.3.0] octane.

To 56 parts (0.30 mole) of 1-aza-2-propyl-5-hydroxymethyl-3,7-dioxabicyclo [3.3.0] octane (b.p. 78°–81°/0.10 mm) dissolved in 150 parts (1.5 mole) of ethyl acrylate was added 2.0 parts (2.7 mole per cent) of dibutyltin oxide and 1.0 part of p-methoxyphenol. The mixture was heated to reflux and an ethanol/ethyl acrylate azeotrope was collected amounting to 100 ml. Ethyl acrylate was added during the reaction in an equal amount to that collected. Workup in the usual way followed by fractional distillation at reduced pressure gave a clear liquid fraction (b.p. 104°–105°/0.20 mm) that showed an IR spectrum in accordance with the expected structure.

EXAMPLE 9

1-aza-2-(3',4'-dichlorophenyl)-5-acryloxymethyl-3,7-dioxabicyclo [3.3.0] octane.

To about 26 parts (0.09 mole) of 1-aza-2-(3', 4'-dichlorophenyl-5-hydroxymethyl-3,7-dioxabicyclo [3.3.0] octane, obtained by the stepwise condensation of THAM with 3,4-dichlorobenzaldehyde and then paraformaldehyde, dissolved in 250 parts (2.5 mole) of ethyl acrylate was added 1.0 part of dibutyltin oxide and 1.0 part of p-methoxyphenol, the resulting mixture being refluxed for 6 hours; about 65 ml. of ethanol-/ethyl acrylate azeotrope was collected and an equal amount of fresh ethyl acrylate was added. Workup in the usual way gave a light green liquid which showed the expected IR spectrum. The monomer was too high-boiling to be purified by fractional distillation, but no residual alcohol absorption on the stripped sample indicated good purity.

EXAMPLE 10

A thin film (0.25-mil) of molten ADOZ was applied to a sheet of uncoated tin plate and then exposed to a 1,200-watt ultraviolet lamp at a distance of 2 inches. The film dried in about 45 seconds.

EXAMPLE 11

The procedure of Example 10 was repeated except that the substrate was glass. The film dried in about 45 seconds.

EXAMPLE 12

The procedure of Example 10 was repeated except that the substrate was paper. The film dried in about 45 seconds.

EXAMPLE 13

The procedure of Example 10 was repeated except that the substrate was cardboard and the monomer was MADOZ. The film dried in about 60 seconds.

EXAMPLE 14

The procedure of Example 10 was repeated except that the monomer was a 50/50 solution of ADOZ and MADOZ. The results were comparable.

EXAMPLE 15

A laminate was made of a film of polymer-coated cellophane and a film of oriented polypropylene with molten ADOZ between the two. The laminate was exposed to ultraviolet light as in Example 1(B), and a tight bond was effected in about 45 seconds.

EXAMPLE 16

A laminate was made of a sheet of copper and a film of Mylar with molten ADOZ between the two. The laminate was exposed to ultraviolet light as in Example 1(B), and a tight bond was effected in about 45 seconds.

EXAMPLE 17

A red ink was prepared from 80 per cent of molten ADOZ and 20 per cent of Lithol Rubine red pigment. A glass bottle printed with this ink was exposed to a 1,200-watt Hanovia ultraviolet lamp at a distance of 2 inches. The ink dried in 45 seconds. It had excellent adhesion to glass and good grease-and rub-resistance.

EXAMPLE 18

A blue ink was prepared from 83 per cent of molten ADOZ and 17 per cent of phthalocyanine blue. Untreated polypropylene was printed with the ink and subjected to ultraviolet light as in Example 1(B). After an exposure of 45 seconds, the ink was dry and adhered well to the substrate.

EXAMPLE 19

The procedure of Example 10 was repeated except that the coating was a 70:30 mixture of molten ADOZ and the photoinitiator of Example 2(*C*). The coating dried in about 2 seconds.

EXAMPLE 20

The procedure of Example 10 was repeated except that the photopolymerizable composition was a 70:30 mixture of MADOZ and a biphenyl containing 60 weight per cent of chlorine. The film dried in about 5 seconds.

EXAMPLE 21

The procedure of Example 15 was repeated except that the adhesive was a 70:30 mixture of molten ADOZ and pentachorobenzene A tight bond was effected in about 60 seconds.

EXAMPLE 22

The procedure of Example 15 was repeated except that the adhesive was a 70:30 mixture of MADOZ and the photoinitiator of Example 2(*C*). A tight bond was effected in about 3.5 seconds.

EXAMPLE 23

The procedure of Example 17 was repeated except that a 70:30 mixture of molten ADOZ and the photoinitiator of Example 2(*C*) was used instead of the ADOZ alone. The ink dried in 2 seconds.

EXAMPLE 24

The procedure of Example 17 was repeated except that the ADOZ was replaced by a 70:30 mixture of MADOZ and the photoinitiator of Example 2(*C*). The ink dried in about 20 seconds.

EXAMPLE 25

The procedure of Example 14 was repeated except that the coating was a 70:30 mixture of 50 ADOZ/50 MADOZ and the photoinitiator of Example 2(*C*). The coating dried in 2.0 seconds.

EXAMPLE 26

The procedure of Example 10 was repeated except that the monomer was 1-aza-2-propyl-5-acryloxymethyl-3,7-dioxabicyclo[3.3.0] octane. The film dried in about 90 seconds.

EXAMPLE 27

The procedure of Example 10 was repeated except that the monomer was 1-aza-2,8-di-n-propyl-5-acryloxymethyl-3,7-dioxabicyclo [3.3.0] octane. The film dried in about 120 seconds.

EXAMPLE 28

The procedure of Example 10 was repeated except that the monomer was 1-aza-2-(3',4'-dichlorophenyl)-5-acryloxymethyl-3,7-dioxabicyclo[3.3.0]octane. The film dried in about 2.5 seconds.

EXAMPLE 29

The procedure of Example 10 was repeated except each of the following was used instead of ADOZ: 1-aza-5-acryloxymethyl-3,7-dioxabicyclo[3.3.0]octane 1-aza-5-methacryloxymethyl-3,7-dioxabicyclo[3.3.0]octane-p-toluenesulfonic acid salt, -p-toluenesulfonic acid salt, and 1-aza-5-acryloxymethyl-3,7-dioxabicyclo[3.3.0]octane-picric acid salt. The results were comparable.

EXAMPLE 30

The procedures of Examples 2(C) and 23 were repeated except that each of the following was used as the photoinitiator instead of the mixture of biphenyls and triphenyls: benzoin methyl ether, benzoin ethyl ether, chlorinated rubber, perchloropentacyclodecane, 2-bromoethyl methyl ether, chlorendic anhydride, polybromoxylene, and chlorinated aliphatic wax. The results were comparable.

EXAMPLE 31

The procedures of Examples 1 through 30 were repeated except that instead of being exposed to ultraviolet light the samples were passed on a conveyor belt beneath the beam of a Dynacote 300,000-volt linear electron accelerator at a speed and beam current so regulated as to produce a dose rate of 0.5 megarad.

These systems produced resinous materials of varying degrees of hardness in films from 0.5 to 20 mils thick having tacky surfaces.

EXAMPLE 32

The procedure of Example 1 was repeated except that the sample was simultaneously exposed to ultraviolet light as in Example 1(B) and electron beam radiation as in Example 31. The surface and interior of the film dried in 30 seconds, and the film was hard and tough.

EXAMPLE 33

The procedure of Example 32 was repeated except that the sample was exposed to ultraviolet light for two-thirds second before and two-thirds second after electron bombardment. The film was hard, tough, and flexible with a dry surface.

EXAMPLE 34

The procedure of Example 32 was repeated except that the sample was exposed to electron beam radiation before and after exposure to ultraviolet light for 0.25 second. The film was hard and dry both internally and on the surface.

EXAMPLE 35

The procedure of Example 32 was repeated except that the sample was exposed to ultraviolet light and then to electron beam radiation. The surface and interior of the film dried in about 30 seconds, and the film was hard and dry to the touch.

EXAMPLE 36

The procedure of Example 32 was repeated except that the sample was exposed to electron beam radiation and then to ultraviolet light. The surface and interior of the film dried in about 30 seconds, and the film was hard and tough.

What is claimed is:

1. A compound having the structure

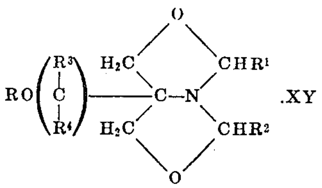

wherein R is -C(O)CH=CH₂, $-C(O)C(CH_3)=CH_2$, or or $-C(O)CH_2C(COOH)=CH_2$ $R^1$ and $R^2$ is each hydrogen, phenyl, halophenyl, or alkyl of 1 to 20 carbon atoms and may be the same or different; $R^3$ and $R^4$ is each hydrogen; XY may by absent; X may be hydrogen and Y may be a p-toluenesulfonate radical or a picrate radical; or X may be alkyl of 1 to 20 carbon atoms and Y may be a halogen.

2. 1-aza-5-acryloxymethyl-3,7-dioxabicyclo[3.3.-0]octane.

3. 1-aza-5-methacryloxymethyl-3,7-dioxabicyclo[3.3.0]octane.

4. 1-aza-5-acryloxymethyl-3,7-dioxabicyclo[3.3.-0]octane -methyl iodide salt.

5. 1-aza-5-acryloxymethyl-3,7-dioxabicyclo[3.3.-0]octane -p-toluenesulfonic acid salt.

6. 1-aza-5-methacryloxymethyl-3,7-dioxabicyclo[3.3.0]octane -p-toluenesulfonic acid salt.

7. 1-aza-5-acryloxymethyl-3,7-dioxabicyclo[3.3.-0]octane -picric acid salt.

8. 1-Aza-5-acryloxymethyl-2,8-di-n-propyl-3,7-dioxabicyclo [3.3.0]octane.

9. 1-Aza-2-propyl-5-acryloxymethyl-3,7-dioxabicyclo [3.3.0] octane.

10. 1-Aza-2-(3',4'-dichlorophenyl)-5-acryloxymethyl-3,7-dioxabicyclo [3.3.0] octane.

* * * * *